(12) United States Patent
Simukka

(10) Patent No.: US 10,652,300 B1
(45) Date of Patent: May 12, 2020

(54) DYNAMICALLY-GENERATED ENCODE SETTINGS FOR MEDIA CONTENT

(71) Applicant: Amazon Technologies, Inc., Reno, NV (US)

(72) Inventor: Kyle Simukka, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 217 days.

(21) Appl. No.: 15/625,094

(22) Filed: Jun. 16, 2017

(51) Int. Cl.
| | |
|---|---|
| *H04L 29/06* | (2006.01) |
| *H04L 12/24* | (2006.01) |
| *H04L 29/08* | (2006.01) |

(52) U.S. Cl.
CPC ........ *H04L 65/607* (2013.01); *H04L 41/0859* (2013.01); *H04L 65/608* (2013.01); *H04L 67/02* (2013.01); *H04L 67/34* (2013.01); *H04L 67/36* (2013.01)

(58) Field of Classification Search
CPC . H04L 65/607; H04L 65/608; H04L 41/0859; H04L 67/02; H04L 67/34; H04L 67/36
See application file for complete search history.

(56) References Cited

U.S. PATENT DOCUMENTS

| | | | | |
|---|---|---|---|---|
| 6,529,146 B1* | 3/2003 | Kowalski | ................. | H03M 7/00 341/50 |
| 6,873,877 B1* | 3/2005 | Tobias | .................... | H04L 29/06 375/E7.016 |
| 9,369,740 B1* | 6/2016 | Funk | ....................... | H04N 21/20 |
| 10,439,831 B1* | 10/2019 | Governale | ........... | H04N 21/266 |
| 2004/0028049 A1* | 2/2004 | Wan | ........................ | H04L 29/06 370/394 |
| 2004/0117427 A1* | 6/2004 | Allen | ............... | H04N 21/21805 709/200 |
| 2007/0180062 A1* | 8/2007 | Southerland | ....... | H04N 21/2187 709/219 |
| 2008/0086570 A1* | 4/2008 | Dey | ................... | H04N 21/2402 709/231 |
| 2008/0092181 A1* | 4/2008 | Britt | ..................... | H04N 7/1675 725/87 |
| 2008/0117966 A1* | 5/2008 | Topiwala | ............... | H04N 7/181 375/240.01 |
| 2008/0195664 A1* | 8/2008 | Maharajh | ................ | H04W 4/06 |
| 2010/0011119 A1* | 1/2010 | Knowlton | ............... | H04L 47/10 709/235 |
| 2011/0039506 A1* | 2/2011 | Lindahl | ................... | G10L 19/20 455/130 |

(Continued)

*Primary Examiner* — Blake J Rubin
(74) *Attorney, Agent, or Firm* — Hogan Lovells US LLP

(57) ABSTRACT

A scalable encoding architecture is able to support multiple encoder versions without requiring new versions of the architecture to be generated and supported for each encoder version. An encoding profile template can be generated that includes the available settings for an encoder. A versioned schema can be generated that defines the settings for a particular encoder version. The schema can be persisted such that when a new channel or media stream is to be generated, the schema can be loaded and its values validated in order to cause the encoder to encode the media content using the appropriate values. An interface presented to the user to generate the template or channel can be dynamically generated such that only the applicable and/or relevant settings for a particular encoder version are displayed.

20 Claims, 8 Drawing Sheets

(56) References Cited

U.S. PATENT DOCUMENTS

| | | | |
|---|---|---|---|
| 2011/0173304 A1* | 7/2011 | Schlack | H04L 65/4084 709/220 |
| 2012/0254456 A1* | 10/2012 | Visharam | H04N 21/2343 709/231 |
| 2012/0293605 A1* | 11/2012 | Seferian | H04N 7/147 348/14.08 |
| 2013/0198328 A1* | 8/2013 | Green | H04L 67/02 709/217 |
| 2013/0204927 A1* | 8/2013 | Kruglikov | G06F 9/54 709/203 |
| 2013/0275557 A1* | 10/2013 | Myers | H04N 21/2221 709/219 |
| 2014/0032775 A1* | 1/2014 | Abiezzi | H04N 19/51 709/231 |
| 2014/0059168 A1* | 2/2014 | Ponec | H04L 67/02 709/217 |
| 2014/0089990 A1* | 3/2014 | van Deventer | H04N 21/218 725/61 |
| 2014/0098850 A1* | 4/2014 | Wolfram | H04N 21/23439 375/240.02 |
| 2014/0247887 A1* | 9/2014 | Brueck | H04N 19/40 375/240.26 |
| 2014/0282736 A1* | 9/2014 | Elstermann | H04N 21/84 725/50 |
| 2014/0282748 A1* | 9/2014 | McNamee | H04N 21/6193 725/63 |
| 2014/0289627 A1* | 9/2014 | Brockmann | H04N 21/23412 715/719 |
| 2014/0365491 A1* | 12/2014 | Macaulay | G06F 16/4387 707/737 |
| 2015/0026358 A1* | 1/2015 | Zhang | H04L 65/601 709/231 |
| 2015/0032857 A1* | 1/2015 | Hamm | H04N 21/234327 709/219 |
| 2015/0201042 A1* | 7/2015 | Shah | H04L 65/60 709/219 |
| 2015/0261600 A1* | 9/2015 | Iturralde | G06F 11/08 714/747 |
| 2015/0288736 A1* | 10/2015 | Caulfield | H04L 65/608 709/219 |
| 2015/0350737 A1* | 12/2015 | Anderson | H04N 21/47205 348/564 |
| 2016/0211982 A1* | 7/2016 | Chen | H04L 12/1868 |
| 2016/0302166 A1* | 10/2016 | Dang | H04W 56/001 |
| 2016/0309182 A1* | 10/2016 | Koren | H04N 19/184 |
| 2017/0078687 A1* | 3/2017 | Coward | H04N 19/395 |
| 2017/0318356 A1* | 11/2017 | Hain | G06Q 30/0251 |
| 2017/0374121 A1* | 12/2017 | Phillips | H04N 21/2402 |
| 2018/0121320 A1* | 5/2018 | Dolby | G06F 11/3608 |
| 2018/0139254 A1* | 5/2018 | Oyman | H04L 65/605 |
| 2018/0146023 A1* | 5/2018 | Park | H04B 1/02 |
| 2018/0205759 A1* | 7/2018 | Hosie | H04L 63/20 |
| 2018/0239524 A1* | 8/2018 | Snibbe | G06F 3/04847 |
| 2018/0295194 A1* | 10/2018 | Deraz | H04L 67/16 |

* cited by examiner

DYNAMICALLY-GENERATED ENCODE SETTINGS FOR MEDIA CONTENT

BACKGROUND

Users are increasingly obtaining content in digital format, often downloading or streaming that content from a remote service. In many cases the content will relate to "live" streaming media content that is transmitted to users as soon as the content can be captured and prepared for transmission over one or more communication channels. Preparing the content for transmission often includes encoding the content using different encoding parameters for each channel. Such an approach involves a complex, hierarchical nested schema and network interface that are compatible with the encoding system. Further, the sets of encoding parameters determined according to this schema need to be managed for various versions of an encoding engine, with each upgrade of the engine requiring a manual review and update of the schema and associated data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the encoding of media using different encoder versions. In particular, various embodiments provide a scalable architecture that is able to support multiple encoder versions without requiring new versions of the architecture to be generated and supported for each new encoder version to be supported. An encoding profile template can be generated that includes the available settings for an encoder. A versioned schema can be generated that defines the settings for a particular encoder version. The schema can be persisted such that when a new channel or media stream is to be generated, the schema can be loaded and its values validated in order to cause the encoder to encode the media content using the appropriate values. An interface presented to the user to generate the template or channel can be dynamically generated such that only the applicable and/or relevant settings for a particular encoder version are displayed.

Various other such functions can be used as well within the scope of the various embodiments as would be apparent to one of ordinary skill in the art in light of the teachings and suggestions contained herein.

Figure 1:
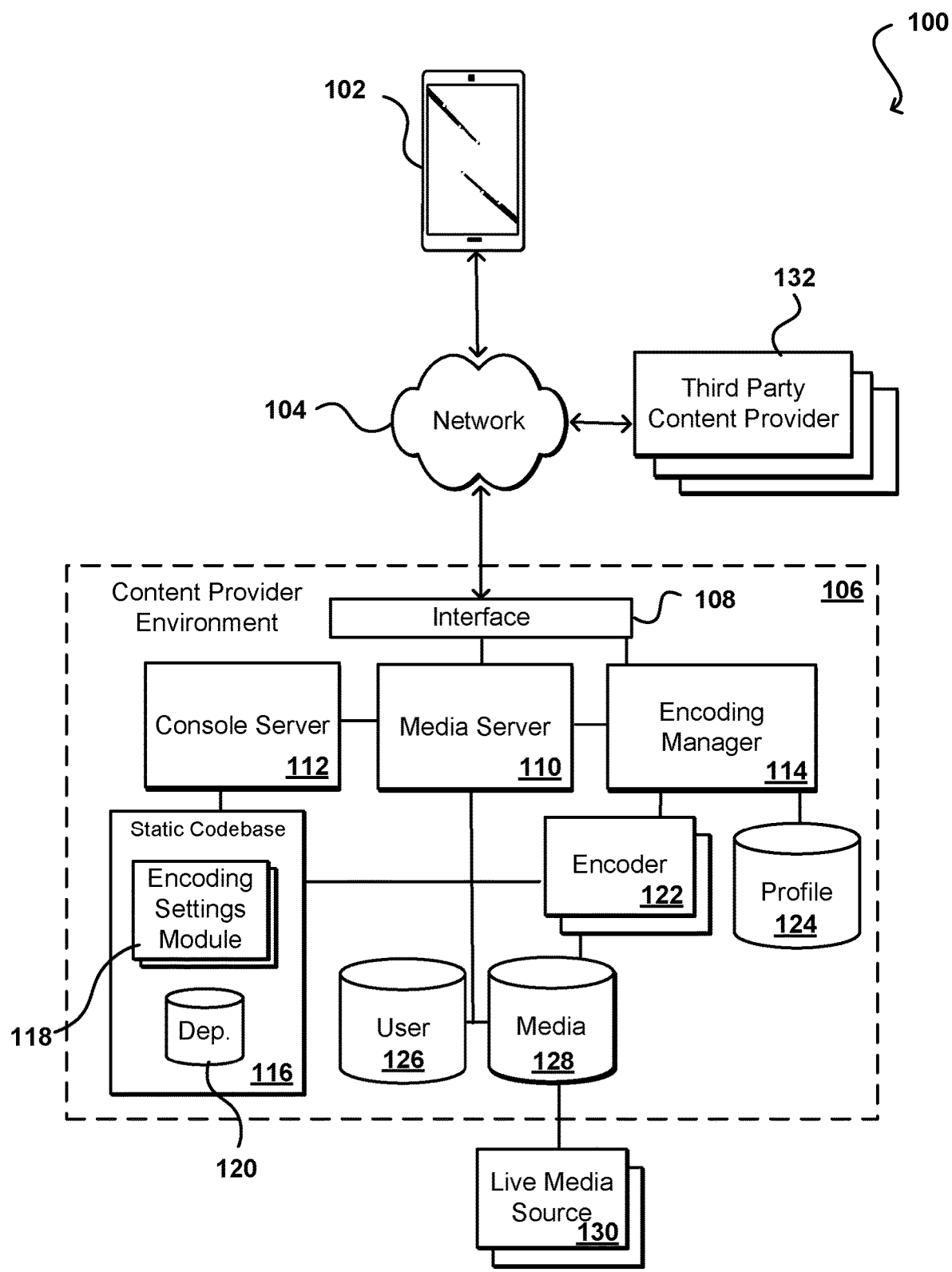
FIG. 1 illustrates an example media encoding system that can be utilized in accordance with various embodiments

FIG. 1 illustrates an example content delivery system 100 that can be used to implement aspects of the various embodiments. In this example, a client computing device 202 can submit a request for content across at least one network 104 to be received by a content provider environment 106. This can include a request for specific content or a subscription to have content pushed to the client device 102, among other such options. In at least some embodiments the request can include a request for content to be displayed on, or presented via, the computing device 102, and in many cases will include audio, video, or other media content that is encoded for presentation by the client device 102. The network(s) can include any appropriate network, such as the Internet, a local area network (LAN), a cellular network, an Ethernet, or other such wired and/or wireless network. The content provider environment 106 can include any appropriate resources for providing content from a resource provider, as may include various servers, data stores, and other such components known or used for providing content from across a network (or from the "cloud"). As mentioned elsewhere herein, the client computing device 102 can be any appropriate computing or processing device, as may include a desktop or notebook computer, smartphone, tablet, wearable computer (i.e., smart watch, glasses, or contacts), set top box, or other such system or device. An interface layer 108, when receiving a request or call, can determine the type of call or request and cause information to be forwarded to the appropriate component or sub-system. For example, a request for content might be forwarded to a media server 110 while a request to specify encoding parameters or generate an encoding profile might be forwarded to a encoding manager 114 or console server 112, among other such options. These calls or requests can also come from third parties, such as streaming content providers who utilize the resources of the content provider environment 106, and third party providers 132 can provide at least some of the media content to be stored to a media repository 128 and/or encoded for display on the client device 102 as discussed herein. Further, a different type of client device 102 can be used to providing encoding information than is used to consume encoded content.

In this example, a call or request received to the content provider environment 106 can be received by an interface layer 108 of the environment. As known for network environments, the interface layer can include components such as interfaces (e.g., APIs), load balancers, request and/or data routers, and the like. If the request is a request for content, such as for a video data stream to be provided to the client device 102, information for the request can be directed to one or more media servers 110, which can obtain the content from a media data store 128 or other such repository or live media source 130 (or data cache temporarily storing media from the live media source) to be sent back across the network(s) 104 to the client device 102, which can be the device submitting the request or a device identified by the request, among other such options. In some embodiments, information for the request might also be compared against user data in a user data store 126 or other such location to determine, for example, whether the user has access rights to that content, and potentially the formats or versions to which the user has access rights.

In at least some embodiments a request from an operator, an administrator, a client device 102, a third party provider 132, or another such source might include a request to specify one or more sets of encoding parameters to be used with a media file. Accordingly, information regarding the encoding parameters can be provided to an encoding manager 114, or other such component or service, that is able to receive the information through an appropriate interface (i.e., an API or console) and cause the profile and parameter data to be stored to at least one appropriate repository 124 as discussed elsewhere herein. When a request for a video file is received, the encoding manager 114 can use the profile and parameter data to determine the appropriate encoding information, and can pass that to one or more encoders 122, such as may include encoding applications running on one or more allocated servers (physical or virtual), which can obtain the media file and encode the media file per the encoding information, which can then be provided to the client device by a media server 110 or other such component.

As mentioned, there are situations where the content to be transmitted to the client device 102 corresponds to a "live" stream. As referred to herein, a live stream refers to a transmission of media content that is received by the content provider environment during a period of capture, such that each frame of media content is received shortly after it is captured, for near real-time representation of an occurrence or event. This media data can be processed (i.e., encoded using appropriate encoding parameters) and then transmitted to the client device with minimal latency, such that the media data can be presented on the client device in near real time (i.e., less than a couple of seconds after the media data was initially captured). Approaches for capturing or displaying live broadcasts and streaming media are well known in the art and as such will not be discussed herein in detail.

For streaming media and other such content transmissions, various video encoding profiles or "presets" can be used that provide for granular control over the encoding parameters for the content to be transmitted. This level of control can require a complex, hierarchical, nested schema, along with an appropriate application programming interface (API) or other such interface, that are compatible with the encoding system. Any incompatibilities can result in a failed or incorrect encoding, which can prevent the media content from accurately being presented by the client device 102. In some conventional encoding systems an encoder appliance can be responsible for presenting, validating, and managing these encoding profiles. Such an architecture can present several challenges, however, such as how to manage these encoding profiles over the life of an encoder appliance that can have frequent changes to the core video encoding engine. For example, an encoding profile created for encoder version 1.0.0 might have a setting called "foo," which might be renamed or replaced for version 2.0.0 with a setting "bar." The version 2.0.0 encoder in this example would then have to maintain an upgrade path for any encoding profile that was created with version 1.0.0. For large numbers of versions and encoding profiles, this can quickly become difficult to manage and can have a high likelihood of error.

Accordingly, approaches in accordance with various embodiments provide a scalable architecture that is able to support current and future version of a media encoding engine. Such architecture can remove the complexity in conventional approaches which rely on the encoder to present and manage multiple encoding profiles. The architecture can provide a profile editor that is independent of any media encoder version, and that provides a normalized interface so that the end user (e.g., customers of the media service or content provider) can create and manage encoding profiles for any released version of the media encoder. In some embodiments, a profile editor can comprise a front-end application that is maintained outside the release cadence of the media editor. This can be a standalone application that customers install or a website accessed through a browser application, among other such options. The core logic for the profile editor can involve consuming a versioned schema, such as a JSON schema, that defines the available encoding settings to be presented to the user. A customer can use the editor to select, define, and/or modify the encoding settings for a profile. Once set, the profile editor can generate an output object, such as a data structure that can be in the form of a JSON object. The output is validated, and if valid can be versioned and written to persistent storage. This versioned output object will be used with the media encoder, in at least some embodiments, to encode corresponding live streaming events or other such content.

As mentioned, a customer can generate multiple profiles and there can be several customers associated with a media service. When combined with the number of encoder versions supported, the number of profiles and settings to manage can be quite large, particularly for enterprise-grade encoders. In conventional approaches, engineers often have to analyze and adjust the various encoding settings for each relevant profile. Encoder updates can be released relatively frequently in order to support new features, provide new settings, support new validations, and provide other such functionality. This can include, for example, supporting a new codec and the associated settings. By providing an architecture that supports such expansion without the need for users to update their software continually, the user experience is improved in addition to the reduction in resources otherwise needed to provide the additional or alternative functionality. Such an approach enables customer to fine tune settings without a need to upgrade, and customers can generate new profiles that are supported by the existing architecture. The architecture can ensure that any impact of the new settings is handled automatically and dynamically with minimal effort on the part of the customer or the provider.

In the system illustrated in FIG. 1, a core, static codebase 116 is provided as part of the dynamic architecture. The codebase can be utilized by a console server 112, encoding manager 114, or other such entity to provide support for new settings and encoders, among other such options. In some embodiments, the static codebase can load and render a file, such as a video encoding profile, that can enable the user to view or modify settings to use for a specific channel or stream, which is relevant for a particular version of a video encoder. An encoding settings module 118 of the codebase can be responsible for pulling the data for a profile from a dependencies data store 120, or other such location, where the data to be loaded for a profile depends on information such as a specified encoder version. The console server 112 can use this information to generate a dynamic display on the client device 102 that guides the customer through the relevant options for a particular encoder version. The encoding manager can also use the static codebase 116 to determine the proper encoding settings for a content stream.

Various other components can utilize the static codebase as well within the scope of the various embodiments. Such an approach enables the content provider environment 106, or a media service provided using resources of the environment, to support an indefinite number of encoders that are released over time, as well as the settings for individual release, without need for a new console deployment. In at least some embodiments, new consoles may be released primarily when needed to update the core logic to provide new options or functionality, not when it is desired to support a new encoder. In various embodiments, the new settings can be stored to a document, object, or file that can be programmatically consumed. This can include, for example, a JSON schema that can be versioned and presented through a normalized interface. A JSON schema, for example, can be loaded by the console, services, or other functions utilized by the content provider and used to validate customer interactions.

In one embodiment, a request for a content stream can be received from the client device 102. The media server 110 can identify the stream as a live stream, and can determine whether an existing stream output exists that has the proper encoding. For the encoding, there can be various input and output groups, which can correspond to a manifest or transport stream. Each output stream can include various types of components, such as a video component, an audio component, caption data, and metadata, among other such options. There can be settings used for the encoding of the output as a whole, as well as for the individual components. The general structure of the streams can be treated as a constant that does not change much over time, but the settings within each of those primitives can change from release to release.

When generating an encoding profile, approaches in accordance with various embodiments can determine all possible values that are valid for each of the primitives. As mentioned, this can include using a JSON schema, Swagger file, XML document, or other such approach to reflect the values. As an example, a customer can select a codec within the video settings. There may be dozens of codecs from which the user can select, and there may be some codecs that are not appropriate for this video stream or channel. The encoding settings module can be used to determine which codecs to provide as options to the customer through the console, as generated using the console server 112. The console service in this embodiment can be programmed to interact with various service endpoints across the content provider environment 106. The console server also is able to locate and serve up the static codebase, which can be pulled from a content delivery network (CDN) or other such location. The console server can obtain the schema modeling documents for generating the encoding profiles, and can generate the necessary information so that the relevant encoder can consume the corresponding profile. Once the customer selects a codec, such as the H.264 codec for high definition digital video, there will be various constraints on the remaining video encoding settings that correspond to the selected codec. The encoding settings module 118 of the static codebase 116 can consume the versioned schema in order to programmatically determine the relevant settings to then surface through the console. The module can also determine appropriate validation instructions for the attributes of the relevant fields. This can include, for example, validating a type of value presented for a field, such as whether the value is a number, string, or Boolean value, among other such options.

The architecture can be written using any appropriate programming language, such as the open-source TypeScript programming language. Such a programming language can be used to provide an architecture that is declarative of all the settings and validations, etc. The static codebase 116 written in that programming language can generate an appropriate persistent object, such as a JSON schema object, once the settings are determined and validated (or during such process). The persistent output object, such as a JSON schema object or document, can represent all settings for each version of the video engine. The schema can specify the entire set of settings available to a user for each output group, where an output group can correspond to a protocol such as the user datagram protocol (UDP), the real-time transport protocol (RTP), Apple's HTTP Live Streaming (HLS) protocol, and the like. Each of these output groups can have a respective set of settings and possible values, which can be maintained by the schema. Each field in the output object can be declarative of how the respective setting should be validated, as well as the information the setting should present and how the application or interface should present the setting. This structure can be repeated for the different components of the stream, in order to include settings for the video, audio, and caption data, among other such options, which might be surfaced to an end user. As mentioned, the JSON file can then be persisted to a location, such as an encoding profile data store 124, which the encoding manager 114, encoders 122, or other components access in order to dynamically load as needed. Each time a new video engine is released, or a new version of an existing engine, the script can be updated to generate new JSON schema modeling.

In some embodiments, the console server consumes a container that corresponds to a specific encoder version. The container can include elements specific to the version, as may include the video engine, the binary, rendering script, and the static codebase, among other such options. Once received, the codebase can be extracted from the container and used to generate a JSON schema, which can be persisted for the encoder version, such as by being written to a private storage bucket in the content provider environment 106. The console server 112 can then access the schema when needed for the specific encoder version. If a customer indicates an intention to create a new channel with the specific version of the video engine, the console server 112 can load the corresponding schema to determine the appropriate settings and other information. The information can be available to various systems and components across the environment in order to perform tasks such as the creation of additional encoders when extra capacity is needed. A customer can create a channel with specific inputs, such as the encoder version, and the relevant encoding parameters can be presented to the customer dynamically as possible options. The user can then select the appropriate values, which can be validated according to the schema. When the user indicates to start the channel, the encoding server can consume the settings from the schema to determine how to run the channel. The encoding manager 114 can obtain the encoding profile from persistent storage and perform validation against the settings that were provided. If the settings are validated, the media server 110 can run the channel that was instructed as part of the encoding process using output from the relevant encoder 122. The validation logic executed by the encoding manager 114 can be the same (or similar) logic as was used by the console server 112 based at least in part upon the relevant schema. The validation at the encoding manager can then function as a check on the validation performed by the console server.

Figure 2:
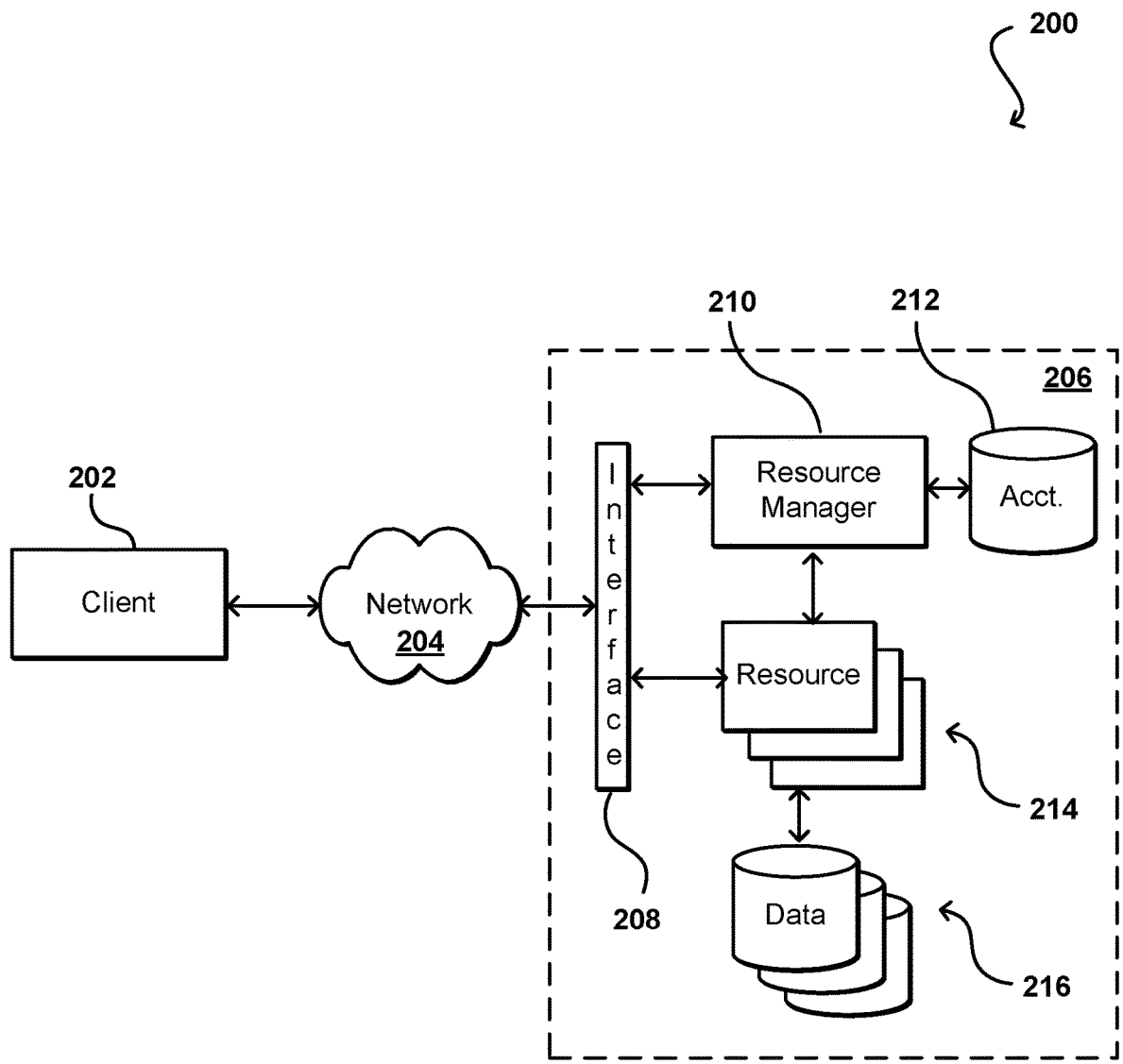
FIG. 2 illustrates an example environment in which various embodiments can be implemented.

FIG. 2 illustrates an example environment 200 in which aspects of the various embodiments can be implemented. Such an environment can be used to allocate resources, or resource capacity, for purposes such as to encode or provide media content, among other such options. In this example a user is able to utilize a client device 202 to submit requests across at least one network 204 to a resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. The network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository. An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 3:
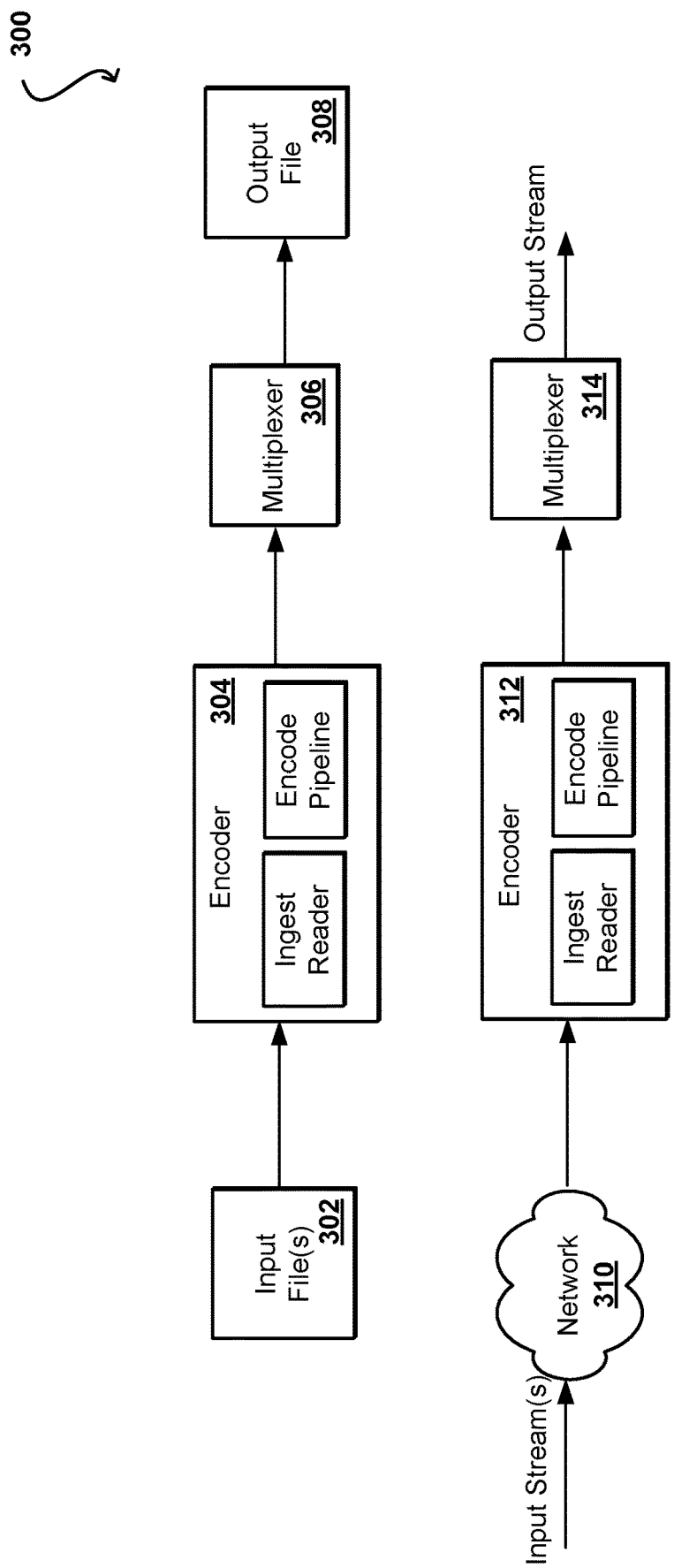
FIG. 3 illustrates an example encoding subsystem that can be utilized in accordance with various embodiments.

In some embodiments the encoding subsystem includes one or more encoders, a set of bitstreams (or video signals), and a content delivery network. Various encoders 304, 312 are illustrated in the example configuration 300 of FIG. 3. The one or more encoders can include both encoders and packagers, which can be implemented via an origin server. A packager can receive a signal (e.g., feed), such as a video signal, a media input file 302, or a live stream over at least one network 310. In this example there is an encoder 304 for the input media files and an encoder 312 for the input streams, with each having a respective multiplexer 306, 314, or sharing a multiplexer, for generating the output file 308 or stream. A live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the content delivery network (CDN). The bitstreams can represent various encoded/packaged versions of the signal feed, as may be encoded per the encoding parameters from the encoding manager. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

Various media encoders or transcoders can monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs) or high-definition multimedia inputs (HDMIs), can be monitored using such processes as well. As mentioned, the media content obtained by such a system can be provided from any of a number of different sources. For example, content might be obtained from a production company or third party provider.

Figure 4:
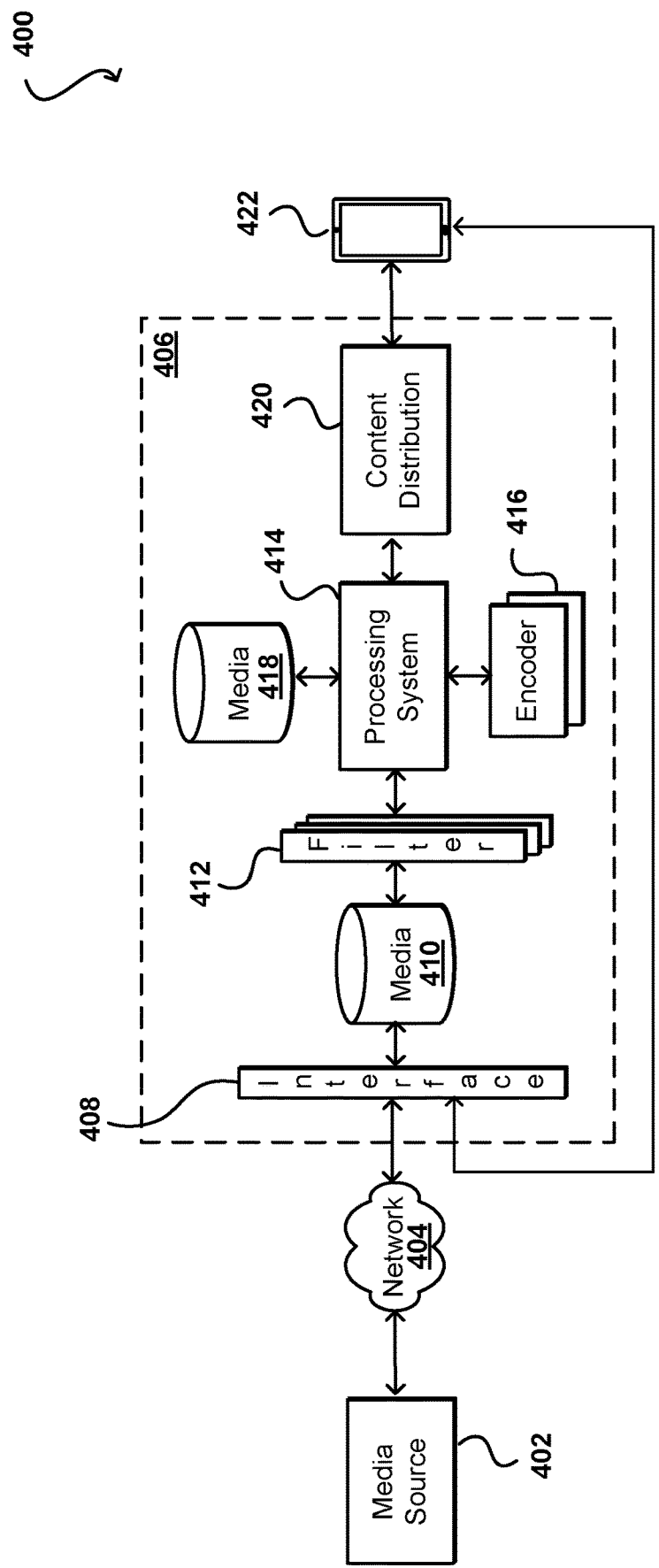
FIG. 4 illustrates an example system that can be used to provide encoded content in accordance with various embodiments.

FIG. 4 illustrates an example system 400 that can be used to implement aspects of the various embodiments. In this example, one or more media sources 402 can upload media content over one or more networks 404 to be received to an interface layer 408 of a content provider environment 406. The content provider can be a shared resource environment, as discussed with respect to FIG. 2, or a dedicated network used by the content provider as part of a content service offering, among other such options. For live streaming options the media repository 410 may act as a cache or buffer, while for other options the repository might store the data until sufficient data has been received or an aggregation process in executed, etc.

In this example a processing system 414 can be tasked with analyzing, aggregating, or otherwise generating media content that can be output for display or other presentation on one or more client devices 422. The processing system can include various processing components such as host machines, virtual machines, and the like. The processing system 414, which can also be offered as a service from inside or external to the content provider environment, can obtain the media content from the media repository 410 and cause one or more filters 412 to be applied to the content. As mentioned, the filters can attempt to remove any content that does not satisfy specific criteria, rules, or policies. For example, filters might remove from consideration any files that are not of a specified format, resolution, minimum or maximum length, size range, orientation, or time period. Other filters might be used as well that might not remove the clips from consideration but might be used to rank those clips for potential selection, such as may include sharpness, blurriness, brightness, contrast, view, capture location, or amount of movement for video content, as well as volume, background noise, and dynamic range for audio content. Various other filters can be applied as well as discussed and suggested elsewhere herein. Further, at least some of these filters can be applied on the media sources 402 before upload. These filters can analyze the captured media content and analyze the content before uploading, or can potentially apply the filters before the capture of the content. For example, if a certain format or orientation is required and an attempt is made to capture and upload content with a different format or orientation, then an application on the device might notify the user before capture that the content does not satisfy the relevant criteria, such that the user can make any appropriate adjustments. In some instances the content adjustments might be made automatically, such as to capture in an appropriate format or resize to a specified size, while other adjustment might need to be made manually, such as to capture with a certain device orientation or adjust the amount of ambient lighting, etc.

The processing system 414 can receive or obtain the video content after the filtering and analyze the media content to determine which audio, video, text, or other content to include in the file or stream. The processing system can cause the content to be converted to at least one appropriate media file, for example, using various encoders 416, transcoders, processing algorithms, or other such components, systems, or services. In at least some embodiments, metadata can be written to the output file using the appropriate settings as discussed herein. The produced media can be written to the same media repository 410 or a different media repository 418, which can store the content for subsequent access or buffer the content for live streaming, among other such options. When the content is to be provided for presentation via a client device 422 or other such system, a content distribution system 420, service, or network can obtain the appropriate data from the repository 418 and cause that content to be provided to the client device 422. In some embodiments, the client device 422 can have the ability to change the feed, stream, or file being received, such as by sending a request to the content distribution system 420 for a new stream, feed, or file. There may also be different versions of the stream, such as may have different sizes, qualities, or formats, from which a viewer can choose. The client device can also potentially upload content related to the media through the interface layer 408 for potential inclusion in subsequent portions, streams, feeds, or files for the content.

Figure 5A:
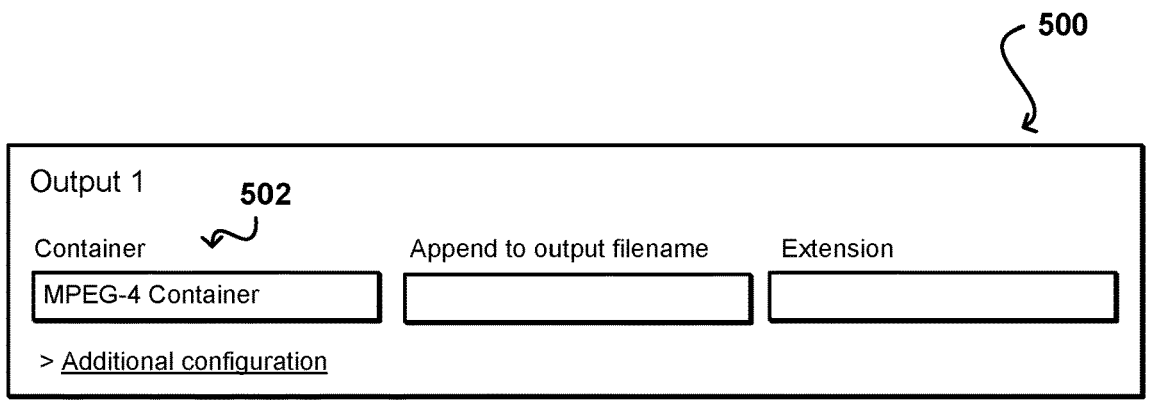
FIGS. 5A and 5B illustrate example interfaces that can be dynamically generated in accordance with various embodiments.
Figure 5B:
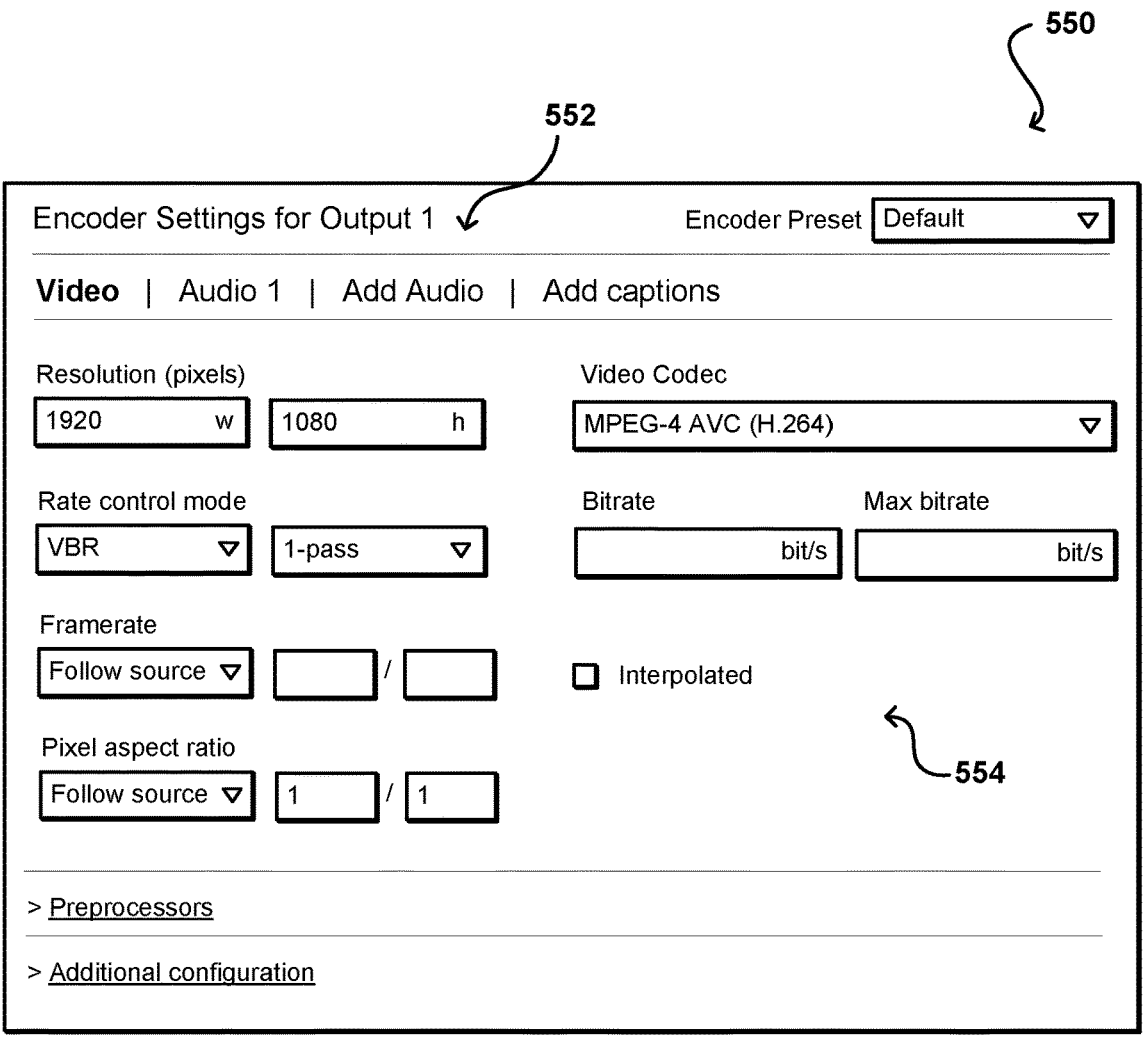

FIGS. 5A and 5B illustrate example interfaces that can be generated in accordance with various embodiments. The interface 500 of FIG. 5A can be generated in response to a customer or user wanting to generate a new output, such as for a new channel. This example interface can enable the user to providing name information for this particular output. A default container name option 502 can be provided in some embodiments, which here can correspond to a specific existing container or a new container to be created, among other such options. The container in this context is related to the output group, and corresponds to the delivery of an encoder that contains the binary, schema, and code for a specific version. In such an instance, the container can refer to a Docker-platform container, which can be used to develop and execute applications in various locations and environments. The interface also provides options for the user to provide additional naming options, such as a filename segment that can be added to the output filename or an extension, such as may specify a particular format or other aspect of the output. As mentioned, these options can be dynamically determined and provided to the user in response to the initial input from the user to generate a new channel or perform another such action.

After specifying or selecting a specific container, for example, a next example interface 550 that can be dynamically determined and presented to the user is illustrated in FIG. 5B. In this example, specific settings relevant to the encoder of the container are determined and presented. Here, the settings are broken down by video, audio, and caption groups, although metadata and other groups can be used as well as discussed and suggested herein. The settings illustrated are dynamically determined for the video group, where the settings can relate to aspects such as the resolution, rate control mode, frame rate, codec, bitrate, and aspect ratio to be utilized, among many other such options. As discussed, for other containers or codecs there can be a different set of settings determined and displayed, as well as different values or types of values presented as options for those settings. In this example, there can be default settings presented which can relate to the input source, customer preferences, output specifics, or the like. The user can change these values either by selecting another provided option or entering a determined value, where permitted. The validation criteria from the container (if already provided) can then analyze the values to determine whether the values are valid per the validation criteria. If so, the settings can be applied and used to generate the new channel. If not, the user can be presented with a notification or error message, and in some instances can be provided with valid options for the settings. As mentioned, the selection of settings and values that are valid for each setting can vary for different containers and between various embodiments. Some or all of the settings and options displayed can be dynamically determined and displayed in response to user input and selections.

In at least some embodiments, the versioned schema can be bundled with the rendering logic as well. Such bundling enables the user interface to be determined, validated, and presented for every version of the relevant encoder. There may be multiple versions of an encoder from which a customer can select. There can be a schema file for each version bundled with the rendering logic, which can be in JavaScript or another appropriate scripting language. When the user selects an encoder version, the media console can load the necessary files for the version, which can include the corresponding schema and rendering logic. Such an approach can provide additional flexibility and scalability by directly paring the rendering logic to a fixed schema, whereby the media console can remain backwards and forwards compatible with the various released versions. Using such architecture, the console in some embodiments only needs to load and initialize the appropriate files and handle any edge cases, such as may relate to Internet connectivity issues, caching, and error handling, among other such options.

Figure 6:
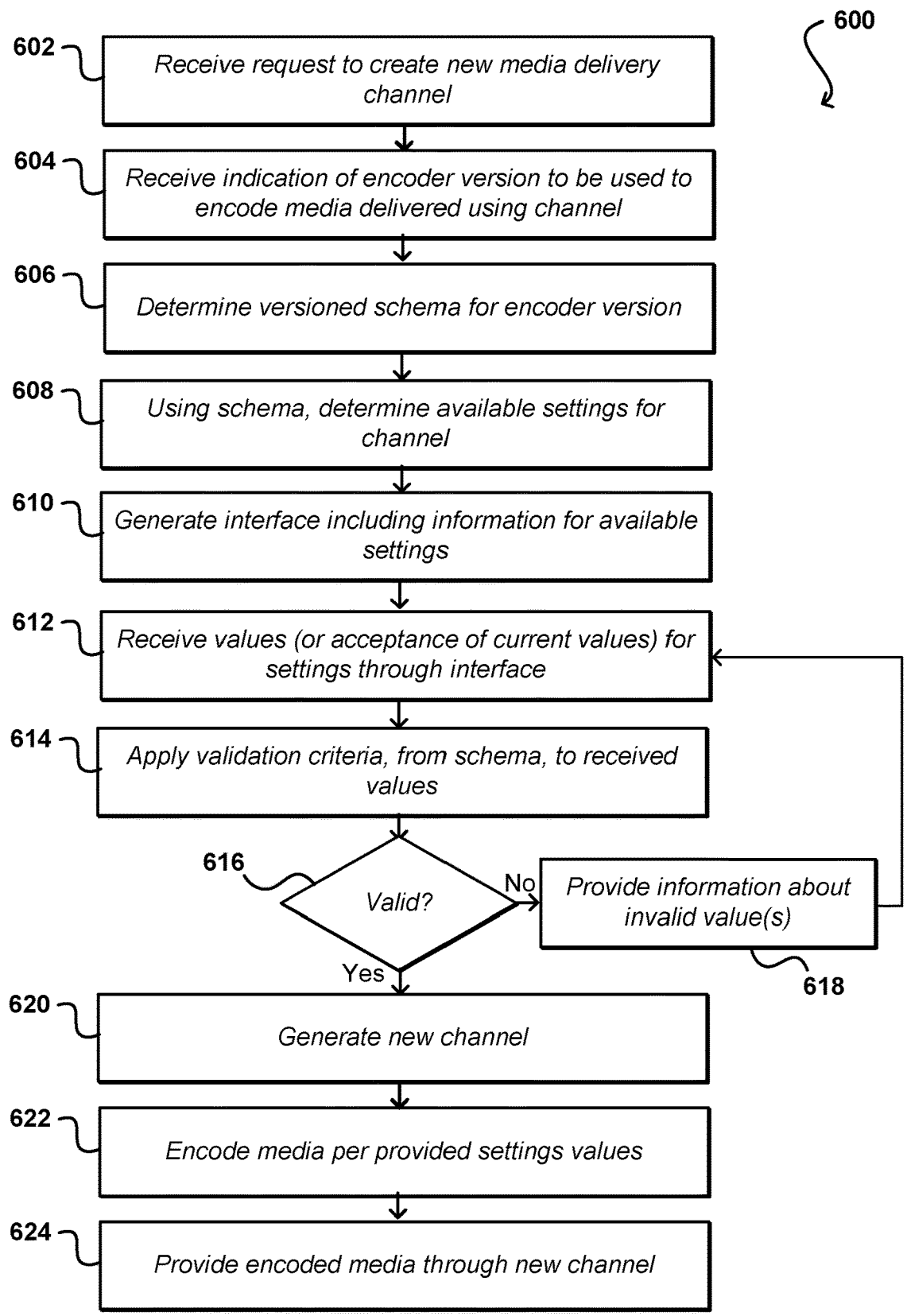
FIG. 6 illustrates an example process for creating a new channel for streaming media that can be utilized in accordance with various embodiments.

FIG. 6 illustrates an example process 600 for creating a new media delivery channel that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a request is received 602 to create a new media delivery channel for a specific type or source of content. The request can be received from a customer or authorized entity, among other such options. The channel can be of any appropriate type known or used for delivering media content as discussed and suggested elsewhere herein. In this example, an indication of a specific encoder version can also be received 604, where that version is to be used to encode media delivered using the channel. The indication can be a specific input from the user or a default value, where the default might be the current or latest version unless otherwise specified. A versioned schema can then be determined 606 or located, as may have been persistently stored for the encoder version. Using information in the schema, as well as the current profile template in some embodiments, the available settings for the channel (or at least those that are modifiable by a user) can be determined 608. These can include, for example, settings specifying resolution, file type, and the like.

An interface, such as an application page or webpage, can be dynamically generated 610 to include information for the available settings as determined per the versioned schema. In addition to presenting only settings that may be available for the specific encoder version the interface in some embodiments might surface only the settings that are relevant, or most relevant, for the particular version, such as those that may be adjustable per the schema. The information can include default values for the settings, a list of selectable options, or other such information. Through the interface one or more values for the settings can be received 612, or in some embodiments the user can accept the default values for the various settings. Applicable validation criteria, which can be version and field specific in some embodiments, can be applied 614 in order to validate the values according to the schema definitions. A determination can be made 616 as to whether the submitted values are valid according to the criteria. If not, information about the invalid value(s) can be provided 618 through the interface and the user can have the option of submitting one or more new values for the channel. In some embodiments guidance or suggested values may also be provided. Once a valid set of values is obtained, the new channel can be generated 620 in response to the request. A media service can initiate or allocate an encoder having the appropriate version to be used with the channel. Media to be delivered via the channel can be encoded 622 per the provided settings values using the allocated encoder, and then provided 624 to the determined endpoint(s) using the newly created channel. Such an approach can work across most or all top level primitives that define a channel will not change, where the primitives can include the inputs, outputs, output groups, and the encoding settings within each output.

Figure 7:
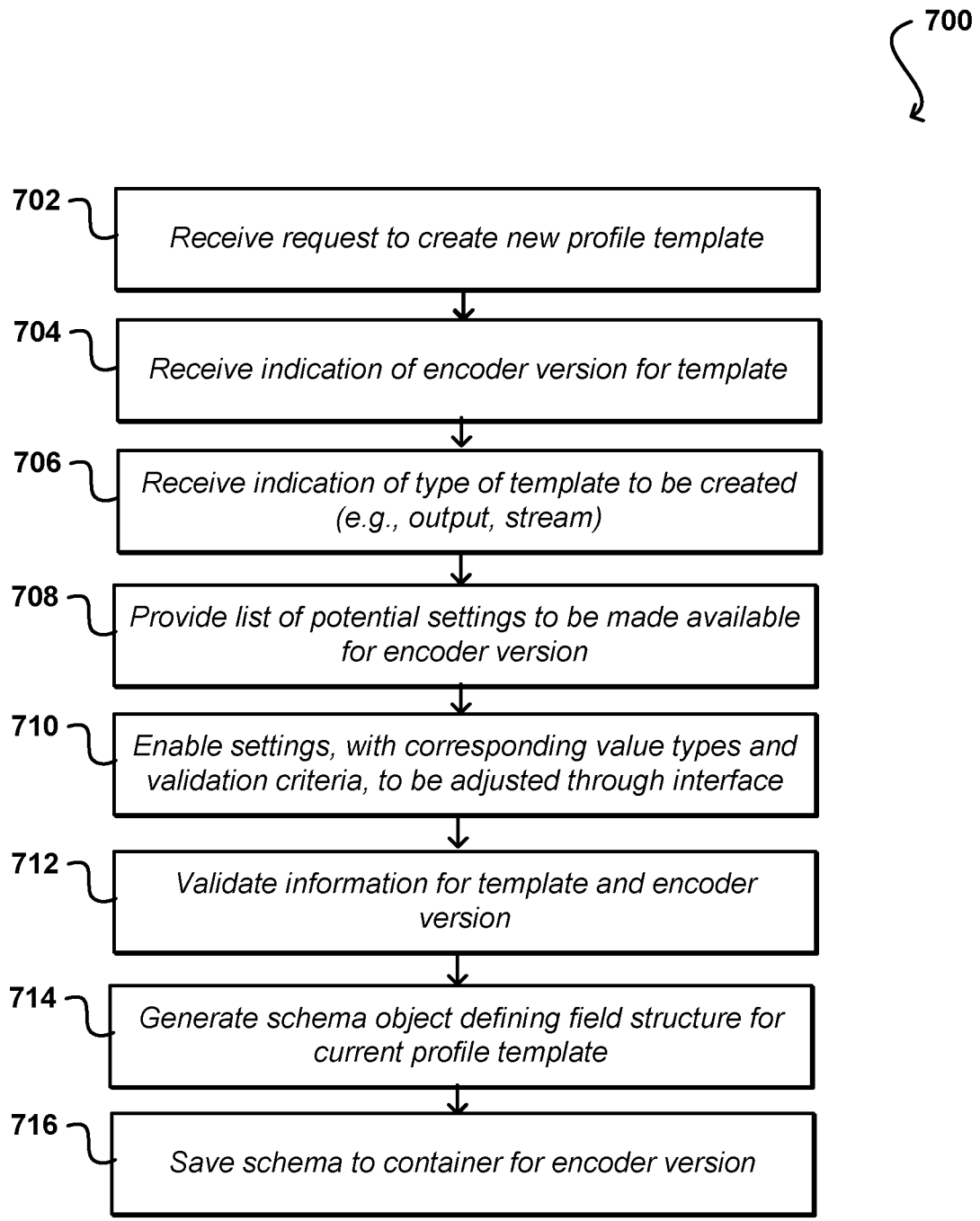
FIG. 7 illustrates an example process for creating a versioned schema for an encoder that can be utilized in accordance with various embodiments.

FIG. 7 illustrates an example process 700 for creating a versioned schema that can be utilized in accordance with various embodiments. In this example a request is received 702 to create a new encoding profile template. As mentioned, encoding profiles are used to encode media to be provided through specific channels or other such mechanisms. An indication of a media encoder version can also be received 704, as profile information will need to be provided for each individual version in at least some embodiments. An indication of a type of template to be created can be received 706 as well, either separately or as part of the initial creation request. Types of templates can include, for example, templates for media output or media streams, among other such options. A list of potential settings for the encoder version can be provided 708, as may be determined based upon information from the encoder or version developer, among other such options. An interface can be dynamically generated that can enable 710 the various settings, along with the types of values and validation criteria for the settings, to be adjusted through the interface. The information received through the interface can be validated 712 against general criteria as well as those for the specific coder version, among other such criteria. A schema object can then be generated 714 that defines the field structure for the current profile template for the specified encoder version. The schema can then be saved 716 or persisted for subsequent use in encoding media using the corresponding encoder version.

Figure 8:
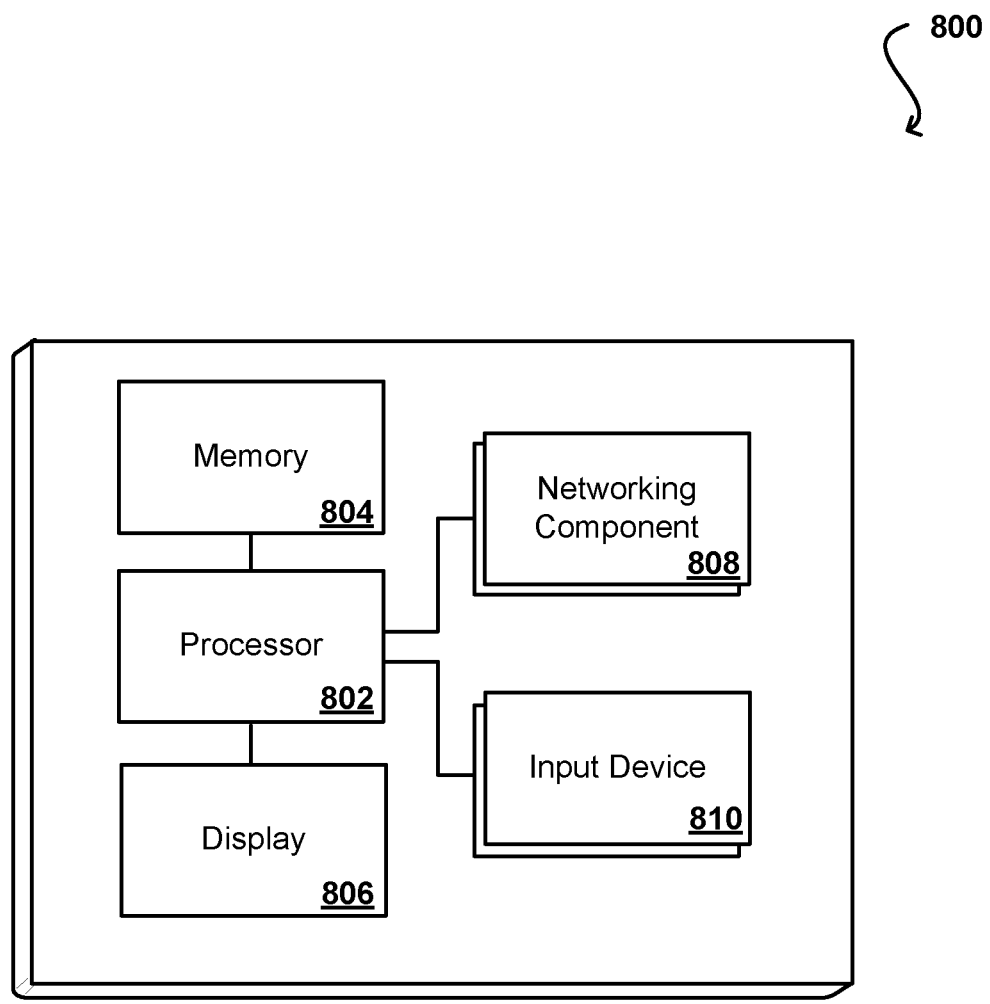
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, on a server remote from a client device, a request from a customer via the client device, to create a media delivery channel for delivering encoded media content;
determining, by the server and based at least in part upon information from the request, an encoder version for a media encoder to generate the encoded media content;
loading a versioned schema defining settings, from a plurality of available settings, that are associated with the encoder version;
dynamically generating, by the server and using the versioned schema, an interface relating to at least a subset of the settings, specific to the encoder version, that are user-modifiable;
providing the interface to the client device;
receiving, via the interface, a submitted set of values for the settings specific to the encoder version as defined by the versioned schema;
validating the submitted set of values using validation criteria specified by the versioned schema;
causing the media encoder to generate the encoded media content, to be delivered via the media delivery channel, using the encoder version and the submitted set of values for the settings; and
delivering the encoded media content to the client device via the media delivery channel.

2. The computer-implemented method of claim 1, further comprising:
generating a profile template for the media encoder, the profile template capable of being used through a profile editor to generate the versioned schema.

3. The computer-implemented method of claim 2, further comprising:
dynamically generating a template-generation interface displaying information relevant in generating the profile template for the media encoder, the template generation interface generated using rendering script useful in generating the interface relating to at least the subset of the settings.

4. The computer-implemented method of claim 2, further comprising:
receiving, through the profile editor, field information for each setting specific to the encoder version, the field information including at least one of a set of possible values, a field type, or at least one validation criterion;
generating the versioned schema based at least in part upon the profile template and the field information; and
persisting the versioned schema to a storage location accessible by the media encoder.

5. The computer-implemented method of claim 1, further comprising:
receiving a request to encode an input media stream;
determining that an additional encoder is needed to encode the input media stream using a specific encoder version; and
allocating the additional encoder using a pool of resource capacity, wherein the additional encoder is enabled to access the versioned schema and execute the encoder version.

6. A computer-implemented method, comprising:
receiving a request from a customer, via a client device, to encode an input media stream using a specified encoder version of a media encoder engine;
loading a versioned schema corresponding to the encoder version, the versioned schema corresponding to an encoder profile template defining parameter values for encoding settings of the specified encoder version, different version schemas capable of being generated using the encoder profile template for different corresponding versions of a plurality of media encoder engines;
dynamically generating, using the versioned schema, an interface enabling specification of the parameter values for the encoder settings specific to the encoder version;
providing the interface to the client device;
validating the parameter values specified by the customer through the interface; and
encoding the input media stream to encoded media output using the specified encoder version and the validated parameter values.

7. The computer-implemented method of claim 6, further comprising:
providing a profile editor for creating profile templates, the profile editor configured to support multiple types of existing encoder profiles and future encoder profiles;
determining settings relevant to the specified encoder version; and
generating a profile interface displaying information relevant in generating a profile template for the encoder.

8. The computer-implemented method of claim 7, further comprising:
receiving selection of a set of parameters, for the profile template, through the profile editor; and
storing the profile template for use in generating the encoder version.

9. The computer-implemented method of claim 6, wherein the versioned schema is one of a JavaScript Object Notation (JSON) document, a Swagger file, or an extensible markup language (XML) file.

10. The computer-implemented method of claim 6, wherein the settings include at least one of a resolution, a rate control mode, a frame rate, a codec, a bitrate, or an aspect ratio.

11. The computer-implemented method of claim 6, wherein the input media stream is a live media stream, and wherein the encoded media output corresponds to one of an output media stream or an output media file.

12. The computer-implemented method of claim 6, further comprising:
receiving a request to create a media delivery channel associated with the encoder version; and
storing a container for the media delivery channel, the container including the versioned schema for the encoder version and rendering script for generating the interface.

13. The computer-implemented method of claim 6, further comprising:
storing, for each setting field of the schema, at least one of a value type and validation criteria.

14. The computer-implemented method of claim 6, further comprising:

generating a respective versioned schema for each of a plurality of output groups, the output groups corresponding to a protocol including at least one of a the user datagram protocol (UDP), a real-time transport protocol (RTP), or an HTTP Live Streaming (HLS) protocol.

15. A system, comprising:

at least one processor; and memory including instructions that, when executed by the system, cause the system to:

receive a request from a customer, via a client device, to encode input media using a specified encoder version of a media encoder engine;

load a versioned schema corresponding to the encoder version, the versioned schema corresponding to an encoder profile template defining parameter values for encoding settings of the specified encoder version, different version schemas capable of being generated using the encoder profile template for different corresponding versions of a plurality of media encoder engines;

generate, using the versioned schema, an interface enabling specification of the parameter values for the encoder settings specific to the encoder version;

provide the interface to the client device;

validate the parameter values specified by the customer through the interface; and encode the input media to encoded media output using the specified encoder version and the validated parameter values.

16. The system of claim 15, wherein the instructions when executed further cause the system to:

provide a profile editor for creating profile templates, the profile editor configured to support multiple types of existing encoder profiles and future encoder profiles;

determine settings relevant to the specified encoder version; and generate a profile interface displaying information relevant in generating a profile template for the encoder.

17. The system of claim 16, wherein the instructions when executed further cause the system to:

receive selection of a set of parameters, for the profile template, through the profile editor; and store the profile template for use in generating the encoder version.

18. The system of claim 15, wherein the versioned schema is one of a JavaScript Object Notation (JSON) document, a Swagger file, or an extensible markup language (XML) file.

19. The system of claim 15, wherein the input media is a live media stream, and wherein the encoded media output corresponds to one of an output media stream or an output media file, and wherein the settings include at least one of a resolution, a rate control mode, a frame rate, a codec, a bitrate, or an aspect ratio.

20. The system of claim 15, wherein the instructions when executed further cause the system to:

receive a request to create a media delivery channel associated with the encoder version; and store a container for the media delivery channel, the container including the versioned schema for the encoder version and rendering script for generating the interface.

\* \* \* \* \*